MULTIPLEXING SYSTEM

Filed June 23, 1954 2 Sheets-Sheet 1

INVENTORS
HILARY MOSS
SAUL KUCHINSKY
BY
Lawrence R. Brown

ATTORNEY

MULTIPLEXING SYSTEM

Filed June 23, 1954 2 Sheets-Sheet 2

INVENTORS
HILARY MOSS
SAUL KUCHINSKY
BY

Laurence R. Brown

ATTORNEY

United States Patent Office 2,848,647

Patented Aug. 19, 1958

2,848,647

MULTIPLEXING SYSTEM

Saul Kuchinsky, Phoenixville, and Hilary Moss, Malvern, Pa., assignors to Burroughs Corporation, Detroit, Mich., a corporation of Michigan Application June 23, 1954, Serial No. 438,805

20 Claims. (Cl. 315—9)

This invention relates to multiplexing systems and more particularly it relates to multiplexing systems utilizing multi-position beam switching tubes to gate successively in time sequence a plurality of signals from several channels into a single output channel.

Prior art signal communication systems have provided multiplexing of a plurality of signals. In systems of this type a plurality of signal channels have been gated successively with multi-position beam switching tubes in order to provide a multiplexed output signal. However, in such prior art systems it has been difficult to make the gated signals entirely independent of noise in the beam switching tubes. In addition it has been difficult to obtain circuits without crosstalk with the several signal channels not gated. Some systems have required separate input signals at different potential levels, and therefore could not directly be operated from a group of signals having the same ground or reference potential.

It is, accordingly, a general object of the present invention to provide improved multiplexing systems operating in connection with beam switching tubes.

It is a more specific object of the invention to provide a multiplexing system utilizing a multi-position beam switching tube in which the multiplexed signal is substantially independent of any switching tube noise.

It is a further object of the invention to provide a multiplexing system utilizing multi-position beam switching tubes and having a plurality of signals with a common reference potential.

Therefore, in accordance with the invention a multi-position tube, having a single cathode and a plurality of target electrodes each for receiving the beam in one of a plurality of stable locked-in beam positions, is used for gating a plurality of separate signals in time sequence into a single output circuit. Each of the cathode-target beam paths is coupled in series with the current path of a signal circuit such as an amplifier tube to provide the gating function. The amplifier tube is connected to receive current only from the switching tube beam. By providing a switching tube which forms a discrete unmodulated beam which is not affected by internal switching tube variations, the beam is confined to a single signal channel and therefore crosstalk between the separate channels is substantially eliminated.

Separate signals are presented directly to the input electrodes of the amplifier tubes and may be continuously modulated even to 100% if desired without causing either crosstalk in a common output signal channel or switching instability. This is effected by means of an alternate beam current path from the switching tube so that substantially constant switching tube current is possible. In order to prevent any noise which might be produced by the beam switching tube from entering the multiplexed output signal, means is provided for holding the potential drop across the amplifier and the beam switching tube constant. This is readily effected by the alternate beam current path when coupled by a low impedance device to a fixed reference potential terminal.

In one embodiment of the invention both the potential drop of the switching tube is held constant and the alternate beam current path is provided by a single rectifier connected between a beam receiving electrode and a constant potential terminal and poled in a direction such that it passes beam current. Thus, the beam current from one target is split into two separate paths, one comprising the amplifier tube and the other comprising the rectifier. In this manner the signal modulation is substantially separated from the current flow or other switching characteristics of the beam switching tube so that reliable multiplexing may be obtained either in the presence of input signals having a high percentage of modulation or beam switching tube current variations.

In accordance with one specific embodiment of the invention a cathode ray tube display system is provided utilizing the multiplexing system provided by the invention. By means of the invention, therefore, a single gun cathode ray tube may be caused to display a plurality of different signals along different horizontal traces presented at any desired vertical location upon the cathode ray display. In this manner signals may be compared with each other, superimposed or placed in juxtaposition. Thus, a single gun cathode ray tube may be made to operate to provide the same functions obtained with expensive multi-gun cathode ray tube oscilloscope circuits.

Further objects and features of advantage of the invention will be found throughout the following detailed description of the invention as described in connection with the accompanying drawings, in which.

Throughout the drawing similar reference characters will be used where possible to designate like circuit features in order to facilitate comparison of the different figures.

Figure 1:
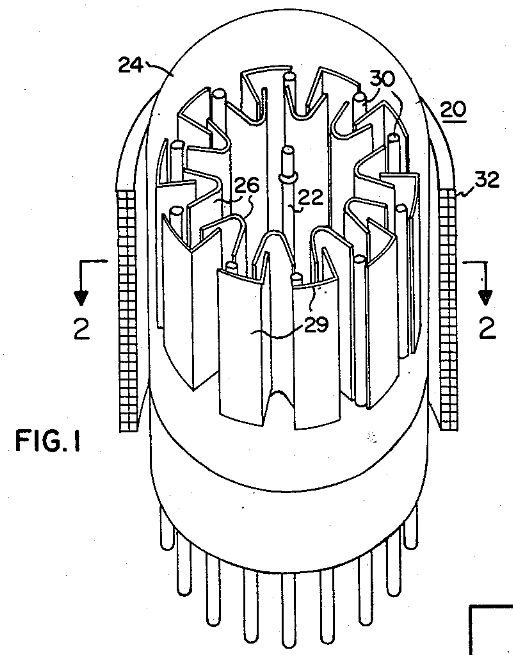
Fig. 1 is a perspective view of a beam switching tube utilized in connection with the invention.
Figure 2:
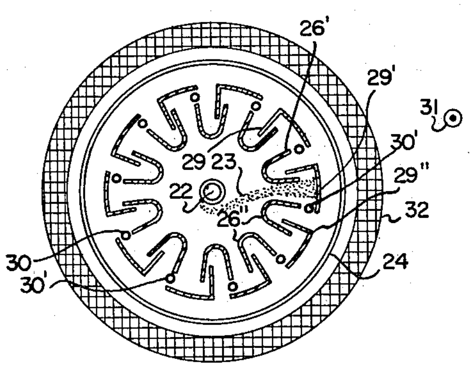
Fig. 2 is a cross section view of the tube shown in Fig. 1.

In Figs. 1 and 2 a multi-position beam switching tube is shown having a plurality of separately selectable stable output positions. This particular tube is known as a magnetron beam switching tube, and is described in the copending application S. N. 370,086, filed July 24, 1953, for "Multi-Position Beam Tube" by Sin-Pih Fan and Saul Kuchinsky. A description of this type of switching tube, now well known in the art, is found in "Electronic Design" for January 1954.

In operation, the beam switching tube 20 has a cylindrical cathode 22 inside the envelope 24 for producing a cathode ray beam. By combined action of the magnetic field provided by the external magnet 32 and the electric field caused by positive potentials coupled to the spade electrodes 26 and target electrodes 29, concentrically disposed about the cathode 22, the beam 23 is formed in the manner shown in Fig. 2. The direction of the magnetic field to cause a beam to attain the position shown in Fig. 2 is indicated by the legend 31 which represents lines of flux proceeding out of the plane of the drawing. With this magnetic field, the beam tends to rotate in a clockwise direction when it is caused to leave a stable locked-in position on one of the targets 29 by action of the switching electrodes 30. Thus, the beam 23 when locked in at a particular target position 29′, will cause the spade 26′ to receive just enough beam current to hold the beam in a stable locked-in position. In order to remove the beam from this stable position, the switching electrode 30′ in the compartment receiving the beam is reduced from its normal potential to cause the beam to travel in a clockwise position and impinge upon the adjacent spade electrode 26″ and therefore become locked-in on the succeeding target 29″. The beam, therefore, is always directed to a single output target and may be selectively switched in succession from one target to another by providing switching potentials on the beam switching electrodes 30.

Figure 3:
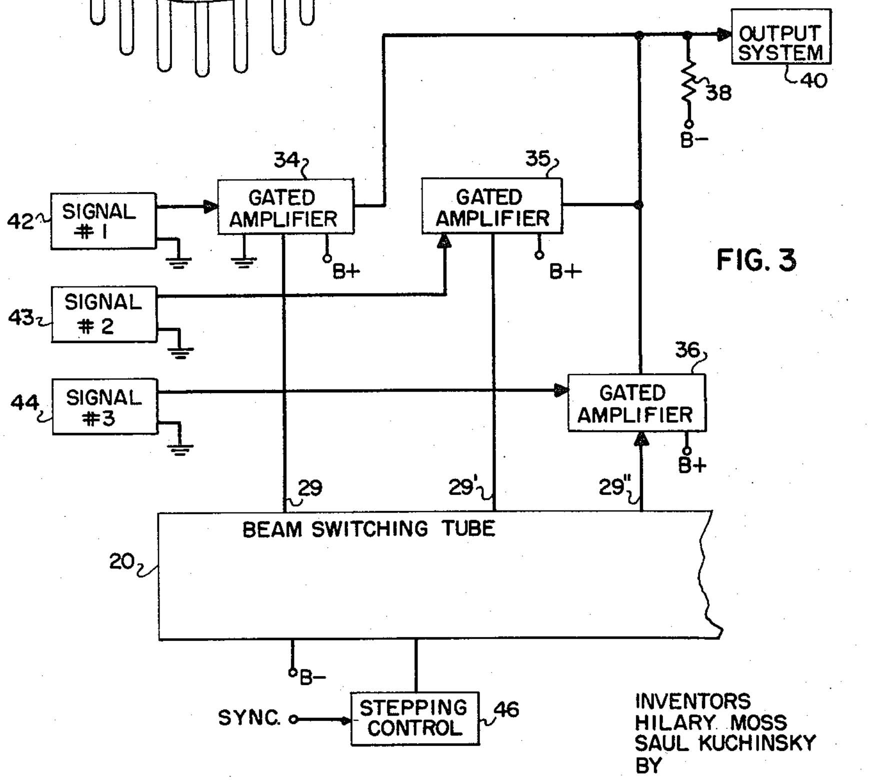
Fig. 3 is a block diagram of a multiplexing system constructed in accordance with the invention.

In Fig. 3 the beam switching tube 20 is represented in block diagram form with a plurality of output leads representing the respective targets 29, 29′ and 29″. As the beam impinges in any one of the stable positions it is caused to gate the respective amplifier circuits 34, 35 or 36 which have a common output impedance 38 for driving a multiplexing output system 40. A separate one of the signal sources 42, 43, 44 is provided for each of the gated amplifier channels so that the respective signals might be synchronously distributed in time sequence into the output system 40 by way of the stepping control circuit 46. When the beam is coupled in series with the amplifier discharge current and is therefore the current source for the gated amplifier tubes, crosstalk between the different channels is eliminated since the beam is confined to a single target electrode and therefore input signals 42, 43, or 44 may not be passed by non-gated amplifiers into the output system 40 even though they might be continuously present.

Figure 4:
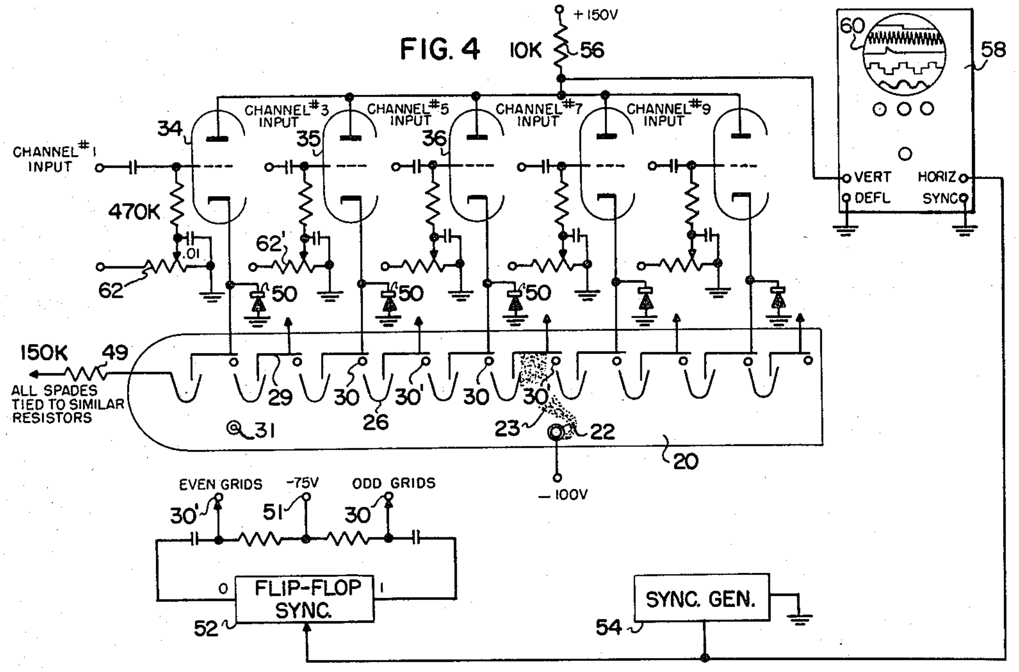
Fig. 4 is a circuit diagram of a multiplexed oscilloscope display system of the invention.

Fig. 4 shows an oscilloscope display system incorporating the multiplexing principles described in connection with Fig. 3. The beam switching tube 20 is diagrammatically shown inside the dotted enclosure. The cathode 22 of the tube is operated at a potential of −100 volts and each of the spade electrodes is tied to ground through a resistor 49 of about 150K ohms. Each of the targets is also maintained at ground potential by means of a crystal rectifier 50 (shown in current flow convention) in proper polarity for passing beam current. Thus, any target while receiving the beam is held near ground potential by current flow through the rectifier 50, thereby establishing a fixed potential drop across both the multiposition beam switching tube and the series amplifier circuit. This substantially prevents any variations of the beam switching tube characteristics from inserting noise into any of the multiplexed signal channels, even though it supplies current for the amplifier tubes.

In order to switch the beam successively from one target to another, the switching grid electrodes are connected in arrays of odd grids 30 and even grids 30′. The even and odd grids are both maintained at a potential slightly more positive than the cathode 22 by the −75 volts at terminal 51. Thus, a 25 volt input switching signal potential will reduce the grids 30 to cathode potential and afford switching. Higher grid potentials would require higher switching potentials. The two grid arrays are alternately lowered in potential by means of the bistable state flip-flop circuit 52 to cause stepping of the beam one position at a time. The frequency of the stepping may be determined by an oscillator or some other type of synchronizing generator 54 connected to trigger the flip-flop circuit 52. The synchronizing generator 54 causes the flip-flop to change stable states from "0" to "1" and "1" to "0" upon successive input pulses resulting in a corresponding decrease of potential of odd grids 30 and even grids 30′ alternatively.

For purposes of clarity, only half the target electrodes of a 10 position beam tube are shown coupled to external series amplifier tubes 34, 35 and 36 etc. in Fig. 4. Input signals from the several channels are connected between the control grids of the amplifier tubes and ground so that each input signal channel may have a common ground. Each of the amplifier tubes is connected through a common output resistor 56 of about 10K ohms to a positive potential in the order of 150 volts. The tubes each may be, for example, half of a type 5687 triode amplifier tube. The common load output resistor 56 which provides the multiplexed signal, is coupled to the vertical deflection terminal of an oscilloscope 58. In addition, the synchronizing generator 54 is coupled to the horizontal sweep synchronizing terminal of the oscilloscope 58 in order to cause the separate horizontal sweep excursion for each synchronizing signal. In this manner the plurality of signals may be displayed respectively upon separate traces of the cathode ray tube screen 60 for comparison.

In order to provide selective vertical displacement of the different signals displayed upon the oscilloscope screen 60, each amplifier tube is provided with a separately adjustable bias potentiometer 62. These bias potentiometers serve to adjust the D. C. level of current flowing through the associated amplifier tubes. Thus, by adjustment of the potentiometer 62 of any channel, the signal for that channel may be positioned vertically upon the oscilloscope screen 60 to occupy any selected position. Therefore, signals from any of the separate channels may be superimposed or juxtapositioned selectively in order to provide comparison.

Figure 5:
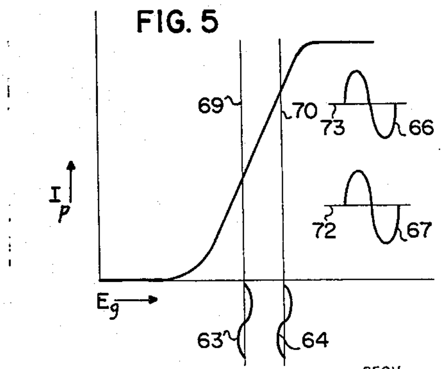
Fig. 5 is a characteristic curve illustrating the manner of operating amplifier tubes in accordance with one aspect of the invention.

Operation of the amplifier tubes is typified by the $E_g$—$I_p$ curve of Fig. 5. Here it is seen that with the same input signal amplitude 63 or 64, the corresponding output signals 66 and 67 have the same amplitude. However, by operating the input signals around different bias levels 69 and 70, the output current operates about different corresponding D. C. levels 72 and 73. As long as the tube is operated along the linear portion of its characteristic curve, little signal distortion is introduced even though the D. C. current level is changed. A change of D. C. current level upon the vertical deflection system of the oscilloscope 58 results in a change of vertical positioning. Therefore, the different horizontal traces containing the respective signals of different channels may be positioned at will in any vertical position upon the oscilloscope screen 60 by means of bias level selection in the signal channels.

Figure 6:
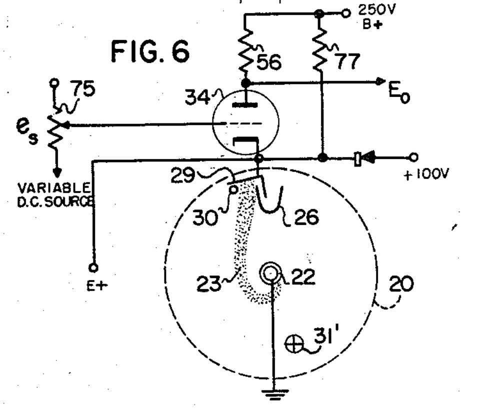
Figs. 6 and 7 are schematic diagrams of a single signal channel as operated in accordance with further embodiments of the invention.

The single signal channel indicated in Fig. 6 includes the serially connected beam current paths of the switching tube 20 and the amplifier tube 34. In this embodiment the amplitude of the signal may be changed by potentiometer 75 without affecting the operating bias of the amplifier tube 34. The bias may be selected with variable resistor 62 in the manner hereinbefore described. The bias potential upon the amplifier tube cathode in this embodiment is obtained from any suitable variable D. C. source. Resistor 77 connected between the B+ terminal and the E+ terminal assures that the anode and cathode of the amplifier tube 34 are maintained substantially at the same potential to avoid current flow in the amplifier tube 34 in the absence of beam current from the switching tube 20. Because of the difference of potential between the B+, E+ and ground terminals, the amplifier tube 34 may tend to pass input signals $E_s$ into the output resistor 56. This may result even when no beam current is available from the switching tube 20 because the crystal rectifier 50 and other circuit components tend to have a finite impedance. Thus, resistor 77 will hold the cathode and anode of the amplifier tube 34 at substantially the same potential in the absence of beam current flow to thereby prevent any signal crosstalk from unused channels from appearing at the output resistor 56. In this respect the resistor 77 is generally made large when compared with the internal resistance of the amplifier tube 34 at the time it is conducting so that substantially the entire switching tube current will pass serially through the amplifier tube 34.

Figure 7:
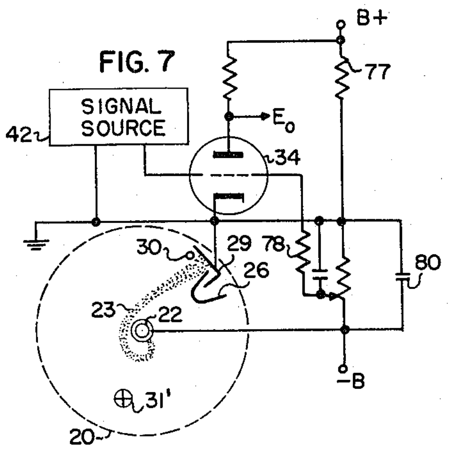

An alternative arrangement of a signal channel is shown in Fig. 7, wherein the cathode of the amplifier tube 34 is maintained at a constant potential by means of the voltage divider from B+ to B− comprising resistors 77 and 78. Because of capacitor 80 across resistor 78, the potential at the cathode of amplifier tube 34 is maintained substantially constant and accordingly the potential drop across the beam switching tube 20 is fixed. Since discharge current may be supplied to the amplifier tube 34 through resistor 78 as well as through the beam switching tube 20, the ratio of resistors 77 and 78 is generally small and should be such that a small bleeder current flows to maintain the cathode of the amplifier tube positive with respect to its grid in the absence of beam current from the switching tube 20, thus keeping that tube cut off.

It is to be recognized from the foregoing description of the invention and the several described embodiments that an improved multiplexing system is afforded in which beam current from a multi-position switching tube may be serially passed through an amplifier device or signal channel without introducing switching tube noise or signal crosstalk into the multiplexed output signal. Accordingly, those features believed descriptive of the nature and scope of the invention are defined with particularity in the appended claims.

What is claimed is:

1. A multiplexed display system comprising in combination, a single beam cathode ray tube, an oscilloscope circuit for operating said tube to provide a display pattern, a synchronizing generator, means coupling said generator to said oscilloscope circuit to initiate horizontal sweep excursions of the cathode ray beam, a beam switching tube having separate elements for providing beam current in a plurality of stable beam positions, control means coupling said synchronizing generator to said switching tube to switch the beam from one stable position to another, separate amplifier tubes each coupled in series with the switching tube elements representing one stable beam position to pass current from the beam, a common output circuit for said amplifier tubes, means coupling the common output circuit to said oscilloscope circuit to provide a vertical display pattern on said cathode ray tube, an input circuit coupling separate signal sources to each of said amplifier tubes, diode rectifier means respectively coupling each of the commonly connected junctions of the series amplifier tubes with those elements representing switching tube stable positions to a fixed reference potential, and mean for separately adjusting the bias of each of said amplifier tubes within a range permitting substantially linear amplification, whereby each of the signals may be selectively displayed along a separate horizontal trace positioned at any vertical location upon the cathode ray display for comparison with any other of the signals.

2. A multiplexing system comprising in combination a beam switching tube having crossed electric and magnetic fields and a plurality of separate target electrodes each for receiving substantially the entire beam current in any one of several corresponding stable locked-in positions, a plurality of switching electrodes in said tube for advancing the beam from one target electrode to another, separate amplifiers each coupled in series with a separate one of the target electrodes to pass beam current, a common output circuit for the amplifier tubes, means for coupling a separate input signal source to each of the amplifiers, and means separately coupling each of the target electrodes to a fixed reference potential.

3. A system as defined in claim 2 wherein the last mentioned means comprises a diode.

4. A system as defined in claim 2 wherein each amplifier is provided with adjustable control means for selecting the output current level.

5. A system as defined in claim 2 including a cathode ray oscilloscope display device, means coupling the common output circuit to the vertical oscilloscope input axis, and means synchronously initiating horizontal oscilloscope excursions and the switching of the beam from target to target.

6. A multiplexing system comprising, a multi-output magnetic beam tube having a plurality of target electrodes and corresponding beam switching electrodes for directing the beam to stable target electrode positions, a plurality of amplifiers each coupled for passing only beam current received by a corresponding target electrode, means for coupling each of a plurality of signal sources to individual ones of said amplifiers, an output circuit common to all of said amplifiers, and a separate rectifier device establishing each of the target electrodes at a fixed reference potential.

7. A circuit as defined in claim 6 wherein a source of power is coupled across said amplifier and the beam tube having a fixed potential tap at said reference potential, and a high impedance circuit with respect to the impedance of the amplifiers coupled across said amplifier to maintain a low potential drop across said amplifier in the absence of beam current upon the corresponding target and in the presence of finite impedance represented by the circuit across the beam tube.

8. In combination, a beam switching tube having a single cathode and a plurality of cathode-target stable beam paths, means for selectively advancing the beam from one target to another, a diode connected for passing beam current from each target to a fixed reference potential, an amplifier connected for passing beam current from each target to a potential more positive than the reference potential, and a plurality of separate input circuits one for each amplifier and each having a common connection to said reference potential.

9. A multiplexing system comprising in combination, a beam switching tube having a plurality of output beam target elements each representing one of a plurality of stable beam positions, a plurality of amplifier devices coupled respectively to said target elements to pass only beam current received by corresponding target elements, means for coupling a plurality of signal sources respectively to said amplifier devices, a common output circuit for said amplifier devices, and means for selectively stepping the beam from one target element to the next.

10. A system as defined in claim 9 including circuit means for establishing the junction of the amplifier devices and the target elements at a substantially fixed reference potential.

11. A system as defined in claim 10 wherein the last defined circuit means comprises a diode rectifier.

12. A system as defined in claim 10 wherein a source of power is coupled to the output element of said amplifier device, and a resistive circuit couples said source of power to the junction of the amplifier devices and the target elements, said resistive circuit having a resistance high with respect to that of the amplifier device when fully conducting, whereby the amplifier device is rendered non-conductive in the absence of a beam current at the corresponding target electrode by maintaining a low potential drop across the amplifier device.

13. A system as defined in claim 9 including means for separately adjusting the current level of each amplifier tube.

14. A multiplexing system comprising in combination, a multi-position beam switching tube having a plurality of target electrodes for receiving beam current in different stable beam positions, two circuits providing current paths coupled to a single target electrode to receive series current from the beam as it impinges upon the corresponding target electrode, one current path comprising a variable impedance device and the other current path comprising a diode rectifier.

15. A system as defined in claim 14 including a circuit coupling said diode rectifier to a substantially constant reference potential.

16. A multiplexing system comprising in combination, a multi-position beam switching tube having a cathode and a plurality of target electrodes, each target being adapted to receiving beam current in a corresponding stable locked-in beam position, a variable impedance device coupled to each target to serially pass current from the beam when it impinges upon corresponding target, means for maintaining a constant potential drop between the switching tube cathode and each target, a common output circuit for all the variable impedance devices, and means separately causing a different signal level to appear at the common output circuit from different ones of the variable impedance devices.

17. A multiplexing system comprising in combination, a multi-position beam switching tube having a cathode and a plurality of target electrodes each for receiving beam current in a corresponding stable locked-in beam position, further electrode means in said switching tube for holding the beam in a locked-in position, means connected for maintaining a constant potential drop between the switching tube cathode and each target while beam current flows to the target, a plurality of signal circuits with a common output circuit, means for gating separate ones of said signal circuits responsive to beam impingement upon corresponding target electrodes, and means independent of the said electrode means for holding the beam for advancing the beam from one target position to another.

18. In combination, a magnetron beam switching tube having a single cathode and a plurality of targets defining cathode-target stable beam paths, switching structure for selectively advancing the beam from one target to another, a diode connected to at least one target for passing beam current from each target to a first fixed potential source, and utilization means coupling said one target to a second fixed potential source more positive than the first source for alternately passing beam current, whereby a beam on said target is maintained in said tube during periods that the utilization means is not drawing beam current by medium of beam current flow through said diode.

19. In combination with a magnetron beam switching tube having a single cathode and a plurality of targets each defining individually selectable cathode-target stable beam paths, a pair of separate beam current flow circuit paths coupled to at least one target, potential means of different magnitude coupled respectively with the separate ones of said beam paths to establish a preferential current flow path, and means for changing the beam current flow in the preferential path in accordance with electrical signals.

20. In combination, a magnetron beam switching tube having a single cathode and a plurality of targets defining cathode-to-target beam paths, switching means for selectively advancing an electron beam from one target to another, and a current-dividing network coupled to each of said target electrodes, said network including a first path through a unidirectional current flow means to a fixed potential source and a second path terminating in an output circuit and including a variable impedance device and having means coupled to said second path for varying both the current flow and the reference level of said current flow through said second path.

References Cited in the file of this patent

UNITED STATES PATENTS

| | | |
|---|---|---|
| 2,465,355 | Cook | Mar. 29, 1949 |
| 2,480,130 | Grieg | Aug. 20, 1949 |
| 2,513,260 | Alfven | June 27, 1950 |
| 2,584,144 | Maresca | Feb. 5, 1952 |
| 2,591,997 | Backmark | Apr. 8, 1952 |
| 2,645,680 | Reeves | July 14, 1953 |
| 2,656,485 | Page | Oct. 20, 1953 |